United States Patent
Rizzo et al.

(10) Patent No.: US 6,773,824 B2
(45) Date of Patent: Aug. 10, 2004

(54) CLAD POWER METALLURGY ARTICLE AND METHOD FOR PRODUCING THE SAME

(75) Inventors: Frank J. Rizzo, McMurray, PA (US); Brian A. Hann, Pittsburgh, PA (US); Joseph F. Perez, Elizabeth, PA (US)

(73) Assignee: Crucible Materials Corp., Syracuse, NY (US)

( * ) Notice: Subject to any disclaimer, the term of this patent is extended or adjusted under 35 U.S.C. 154(b) by 0 days.

(21) Appl. No.: 10/457,458

(22) Filed: Jun. 10, 2003

(65) Prior Publication Data

US 2003/0206818 A1 Nov. 6, 2003

Related U.S. Application Data

(62) Division of application No. 09/907,934, filed on Jul. 19, 2001, now Pat. No. 6,623,690.

(51) Int. Cl.⁷ .............................. B32B 15/16; B22F 7/02; F16L 13/007
(52) U.S. Cl. ...................... 428/548; 428/557; 428/558; 138/141; 138/557; 419/6; 419/38; 419/66
(58) Field of Search ............................... 419/6, 38, 66; 138/141, 557; 428/548, 557, 558

(56) References Cited

U.S. PATENT DOCUMENTS

| | | | |
|---|---|---|---|
| 3,031,343 A | * 4/1962 | Pfeiffer | |
| 3,060,557 A | * 10/1962 | Rostoker et al. | |
| 3,142,560 A | * 7/1964 | Storchheim | |
| 3,652,235 A | * 3/1972 | Manilla et al. | |
| 3,678,567 A | * 7/1972 | Manilla et al. | |
| 3,780,418 A | * 12/1973 | Hurst | |
| 3,804,679 A | * 4/1974 | Streel | |
| 3,810,287 A | * 5/1974 | Pryor et al. | 428/607 |
| 4,178,417 A | * 12/1979 | Oda et al. | 428/679 |
| 4,447,389 A | * 5/1984 | Bruce | 419/6 |
| 4,510,171 A | * 4/1985 | Siebert | 427/455 |
| 4,514,470 A | * 4/1985 | Rosenthal et al. | 428/662 |
| 4,602,952 A | * 7/1986 | Greene et al. | 75/228 |
| 4,844,863 A | * 7/1989 | Miyasaka et al. | 419/8 |
| 5,069,866 A | * 12/1991 | Ekbom | 419/6 |
| 5,273,831 A | * 12/1993 | Jackson et al. | 428/614 |
| 5,376,464 A | * 12/1994 | Dupoiron et al. | 428/679 |
| 5,445,787 A | * 8/1995 | Friedman et al. | 419/38 |
| 5,874,178 A | * 2/1999 | Takayasu | 428/681 |
| 6,203,752 B1 | * 3/2001 | Bewlay et al. | 419/6 |

* cited by examiner

Primary Examiner—John J. Zimmerman
Assistant Examiner—Jason L Savage
(74) Attorney, Agent, or Firm—Finnegan, Henderson, Farabow, Garrett & Dunner LLP

(57) ABSTRACT

A clad article of a substrate of one powdered metal that is clad with a second dissimilar powdered metal. A separation layer may be provided between the substrate and the clad layer to separate these layers during consolidation and to facilitate bonding thereof. The consolidation operation may be performed by hot isostatic pressing of the powders within a deformable container.

11 Claims, 1 Drawing Sheet

CLAD POWER METALLURGY ARTICLE AND METHOD FOR PRODUCING THE SAME

This is a division of application Ser. No. 09/907,934, filed Jul. 19, 2001 Now U.S. Pat. No. 6,623,690 which is incorporated herein by reference.

BRIEF DESCRIPTION OF THE INVENTION

1. Field of the Invention

The invention relates to a clad article of powdered metal and a method for producing the same, wherein the substrate and the clad layer are both of powdered metal of dissimilar composition.

2. Background of the Invention

It is known in the art to produce powder metallurgy clad articles, particularly employing hot isostatic pressing for the production of the same. Specifically, the known processes are substantially the same with variations only on where and how the clad metal layer is applied. For example, it is known to clad the outside or the inside of a hollow bar by hot isostatic pressing. Currently, the substrate for the clad layer has usually constituted part of the container for the clad powder used during hot isostatic pressing.

In more specific applications such as the production of a hollow bar used to inject semi-solid material of magnesium and aluminum into a die assembly, the highly corrosive properties of these materials in a semi-solid state require that the interior of the hollow bar be resistant to this corrosion. Consequently, the interior of these hollow bars for this injection of semi-solid magnesium and aluminum are usually of a refractory metal alloy containing, for example, 50% Nb, 30% Ti, 20% W. This alloy does not have sufficient strength or toughness to be used as a monolithic component. In addition, the cost of a monolithic component of this material would be prohibitive.

Alloy steel is the ideal component for the substrate of this hollow bar for this application. However, in injection applications of semi-solid magnesium and aluminum, the temperatures employed are about 1200° F. These temperatures are too high for alloy steel to maintain its strength. In addition, alloy steel is not sufficiently corrosion resistant with respect to semi-solid magnesium or aluminum. Therefore, the ideal material for this purpose is a nickel base alloy. However, even with nickel base alloys, the hot isostatic pressing practice used for cladding may be performed at a temperature sufficiently high such that uncontrollable grain growth occurs.

SUMMARY OF THE INVENTION

It is accordingly, a primary object of the present invention to provide a powdered metal clad article and method for producing the same, wherein the cladding operation may be performed efficiently, as by the use of hot isostatic pressing, to achieve an article constituting a substrate of one powdered metal and a clad layer of a second dissimilar powdered metal.

A further object of the invention is to provide a clad article of this type wherein the dissimilar metals may be selected to provide the properties required for a particular application, for example, a high strength substrate to which a clad layer of a highly corrosion resistant alloy is bonded.

In accordance with the invention, the clad article thereof comprises a substrate of one powdered metal and clad layer of a second dissimilar powdered metal bonded to the substrate to form the final clad article. At least one additional clad layer of an additional dissimilar powdered metal may also be bonded to the substrate.

A solid metal separation layer may be provided between the substrate and the clad layer. This metal separation layer may be a bonding agent for bonding the substrate and the clad layer. This metal separation layer may be steel.

The substrate may be a nickel base alloy with the clad layer being a refractory metal alloy, such as an alloy of Nb, Ti, W. Specifically, the clad layer may be of an alloy comprising, in weight percent, about 50% Nb, about 30% Ti, and about 20% W.

The powdered metal of the substrate and the clad layer may be of prealloyed powder.

The powdered metal of the substrate and the dissimilar powdered metal of the clad layer may have a similar packing density.

The clad article may be in the form of a hollow bar. The hollow bar may have the clad layer bonded to an interior substrate surface thereof.

In accordance with the method of the invention, the clad article having a substrate of one powdered metal and a clad layer of a second dissimilar powdered metal bonded to the substrate may be produced by providing a deformable container, positioning within the deformable container a layer of powder of the one powdered metal and an adjacent layer of powder of a second dissimilar powdered metal, and deforming the container to consolidate and bond the one layer and adjacent layer of powder to substantially full density to form the clad article. At least one additional clad layer of an additional dissimilar powdered metal may also be bonded to the substrate.

A solid metal separation layer may be positioned between the layers of powder within the deformable container to bond the layers during deforming of the container.

This separation layer may be steel.

One of the layers may be a nickel base alloy and the second dissimilar powdered metal layer may be a refractory metal alloy, such as an alloy of Nb, Ti, W and specifically, about 50% Nb, about 30% Ti, and about 20% W.

The powder of each layer may be prealloyed powder.

The powder of each layer may have similar packing density.

The final clad article may be in the form of a hollow cylinder. The hollow cylinder may have a clad layer bonded to an interior substrate surface thereof.

DETAILED DESCRIPTION OF THE INVENTION

Figure 1:
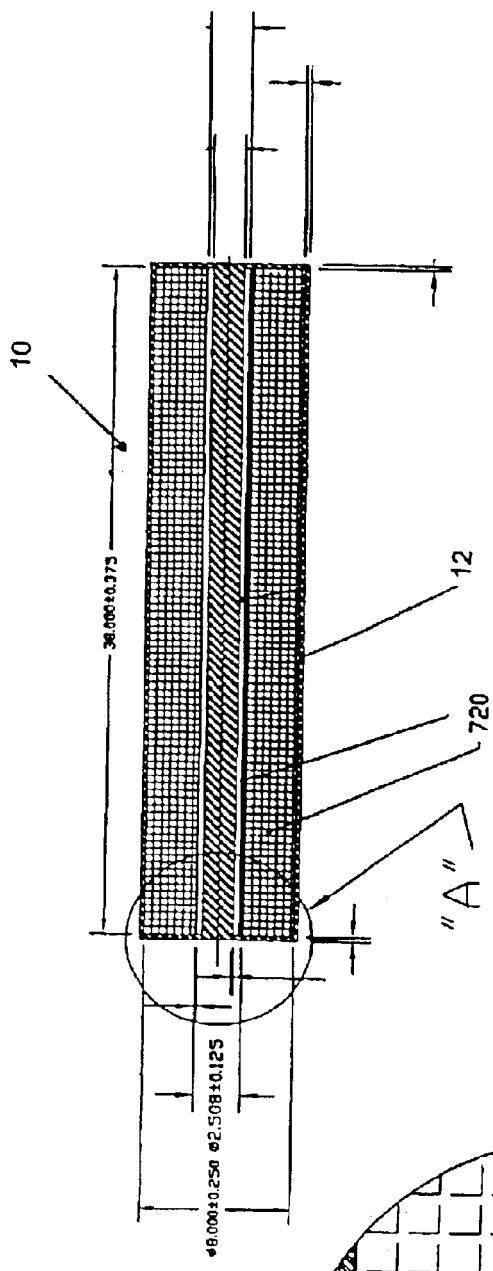
FIG. 1 is a schematic showing in vertical cross section of a deformable container in vertical cross section after compaction in accordance with the invention.
Figure 2:
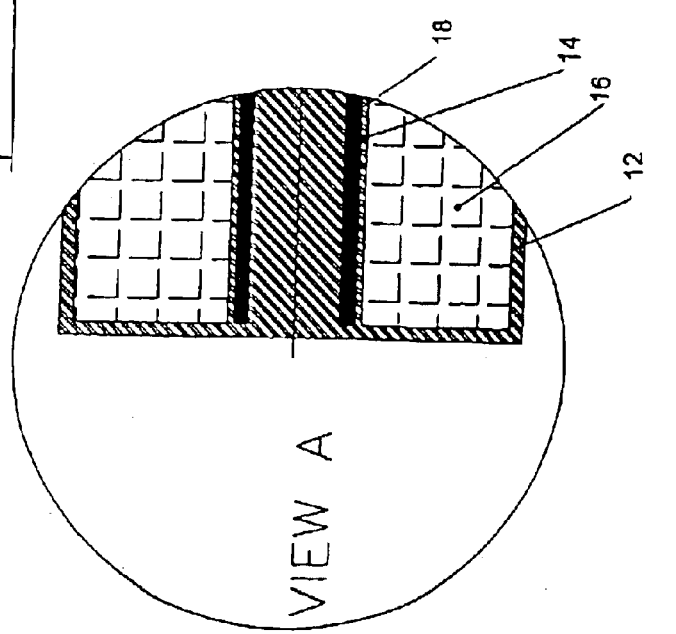
FIG. 2 is an enlarged view of a portion of FIG. 1.

With reference to the Figures, and specifically with reference to FIG. 1, there is shown a deformable container after hot isostatic pressing thereof to produce the clad article in accordance with the invention. This assembly is designated generally as 10.

The assembly 10 includes a deformable container 12, which may be of mild steel, and a liner 14 which may be of stainless steel or mild steel. A hollow cylindrical substrate 16, which may be a nickel base alloy, is bonded to an interior clad layer 18, which may be an alloy of Nb, Ti, W.

Consequently, after hot isostatic pressing to consolidate and bond the substrate 12 and cladding layer 18, which are prealloyed powder particles, upon removal of the container 12 a clad article in accordance with the invention is obtained. The metal separation layer 14 is used to separate the two dissimilar powdered metal components 16 and 18, as well as facilitating bonding thereof during hot isostatic pressing.

What is claimed is:

1. A clad article comprising, a substrate of a powdered nickel base alloy, and a clad layer of a powdered refractory alloy bonded to said substrate to form said clad article.

2. The clad article of claim 1, wherein at least one additional clad layer of an additional dissimilar powdered metal is bonded to said substrate in addition to said clad layer of said powdered refractory alloy.

3. A clad article comprising, a substrate of a powdered nickel base alloy, and a clad layer of a powdered refractory alloy bonded to said substrate, with a solid metal separation layer between said substrate and said clad layer, to form said clad article.

4. The clad article of claim 3, wherein said metal separation layer is a bonding agent for bonding of said substrate and said clad layer.

5. The clad article of claim 3, wherein said metal separation layer is steel.

6. The clad article of claims 1, 2 or 3, wherein said clad layer is a Nb, Ti, W alloy.

7. The clad article of claim 6, wherein said clad layer is an alloy comprising, in weight percent, about 50% Nb, about 30% Ti and about 20% W.

8. The clad article of claims 1, 2 or 3, wherein said powdered nickel base alloy and said powdered refractory alloy are of prealloyed powder.

9. The clad article of claim 8, wherein said powdered nickel base alloy and said powdered refractory alloy have similar packing density.

10. The clad article of claims 1, 2 or 3, wherein said clad article is a hollow cylinder.

11. The clad article of claim 10, wherein said hollow cylinder has said clad layer bonded to an interior substrate surface thereof.

* * * * *